(12) United States Patent
Varnum (10) Patent No.: US 9,301,636 B2
(45) Date of Patent: Apr. 5, 2016

(54) BEVERAGE PRESS

(71) Applicant: Grant Varnum, Twinsburg, OH (US)

(72) Inventor: Grant Varnum, Twinsburg, OH (US)

(73) Assignee: Grant F. Varnum, Twinsburg, OH (US)

( * ) Notice: Subject to any disclaimer, the term of this patent is extended or adjusted under 35 U.S.C. 154(b) by 320 days.

(21) Appl. No.: 13/958,068

(22) Filed: Aug. 2, 2013

(65) Prior Publication Data

US 2014/0060337 A1   Mar. 6, 2014

Related U.S. Application Data

(60) Provisional application No. 61/678,832, filed on Aug. 2, 2012.

(51) Int. Cl.
*A47J 31/00* (2006.01)
*A47J 31/38* (2006.01)
*A47J 31/02* (2006.01)
*A47J 31/20* (2006.01)

(52) U.S. Cl.
CPC *A47J 31/38* (2013.01); *A47J 31/02* (2013.01); *A47J 31/20* (2013.01)

(58) Field of Classification Search
CPC .................................. A47J 31/20; A47J 31/02

USPC ...................... 99/297, 287, 323; 220/625, 703
See application file for complete search history.

(56) References Cited

U.S. PATENT DOCUMENTS

| | | | | |
|---|---|---|---|---|
| 6,422,133 | B1 * | 7/2002 | Brady | 99/297 |
| 6,964,223 | B2 * | 11/2005 | O'Loughlin | 99/297 |
| 7,194,951 | B1 * | 3/2007 | Porter | 100/116 |
| D571,610 | S | 6/2008 | Bodum | |
| 8,234,971 | B2 * | 8/2012 | Cerroni | 99/287 |
| 8,613,402 | B2 * | 12/2013 | Lefkovitz | 241/30 |
| 8,863,650 | B2 * | 10/2014 | Lin | 99/297 |
| 8,887,623 | B2 * | 11/2014 | Giordano | 99/297 |
| 2013/0213240 | A1 * | 8/2013 | O'Brien et al. | 99/297 |

* cited by examiner

*Primary Examiner* — Reginald L Alexander
(74) *Attorney, Agent, or Firm* — McDonald Hopkins LLC (57) ABSTRACT

A beverage press is shown and described. The beverage press may include a lid, a liquid containing member having upper and lower portions, where the upper portion of the liquid containing member is selectively engaged with the lid. The beverage press may also include a press operatively secured with the lid and extending within the liquid containing portion, where the press is microwaveable, and a solid retaining member selectively engaged with the lower portion of the liquid containing member.

18 Claims, 9 Drawing Sheets

BEVERAGE PRESS

CROSS-REFERENCE TO RELATED APPLICATION

This application claims the benefit from U.S. Provisional Patent Application No. 61/678,832 entitled "Coffee/Beverage Press" filed on Aug. 2, 2012, which is hereby incorporated in its entirety by reference.

FIELD OF THE INVENTION

The present invention is generally related to a beverage press and, more particularly, to a microwaveable coffee press with a removable grounds chamber and incremental volume measurements.

BACKGROUND

The traditional coffee/beverage press has long been viewed as the most optimal way of brewing/steeping hot beverages. A coffee/beverage press allows the solids and liquids to coexist for an extended period of time to extract the maximum flavor from the solids. Further, the coffee/beverage press eliminates the need for a filter of some kind to separate solids and liquids. Still further, the coffee/beverage press enables the user to create any coffee/tea flavor of choice at any desired variable strength level and may eliminate waste by providing the desired size as opposed to providing a fixed size. The cost of using the coffee/beverage press may reduce the overall cost of a cup of coffee/tea to almost the most efficient level possible ($0.10-$0.25 per cup versus $2.00+ at coffee houses and $0.75 per cup from single serve home brewing systems). There are many other benefits of a traditional coffee/beverage.

There are, however, many drawbacks to the current coffee/beverage press that may generally outweigh the benefits for most users, especially the on-the-go user. By way of non-limiting examples, cleaning the unit is often a hassle, as it takes some sort of plunging sponge apparatus, or minimally a dishwasher, to get down to the bottom of the cup and clean the residue left over, not to mention the additional solids that are pushed to the bottom of the cup. Further, coffee grounds can often times clog drains, and create messes/stains if not carefully disposed of, in a very time and labor intensive process.

Therefore, there is a need for an improved coffee/beverage press that overcomes the above-mentioned shortcomings. There is a need for a coffee/beverage press that provides easy disposal of the grounds present. There is a need for a coffee/beverage press that is easier to clean and one that is easier to operate. The solution is a removable bottom—a portion of the cup that is large enough to hold the solids that have been pushed through the liquids. This portion of the cup may then be removed over a garbage container, garden, compost area, etc., and the spent solids can simply be expelled from the smaller portion of the cup. A quick rinse of both open ends to get rid of the rest of the solids, and suddenly all of the benefits of a coffee/beverage press become far greater than the drawbacks.

SUMMARY

A beverage press is shown and described. The beverage press may include a lid, a liquid containing member having upper and lower portions, where the upper portion of the liquid containing member is selectively engaged with the lid. The beverage press may also include a press operatively secured with the lid and extending within the liquid containing portion, where the press is microwaveable, and a solid retaining member selectively engaged with the lower portion of the liquid containing member.

A beverage press may include a lid, a liquid containing member selectively engaged with the lid, and a press extending within the liquid containing portion. The beverage press may also include a solid retaining member selectively removable from the liquid containing member, where the press extends into the solid retaining member to press solid contents into the solid retaining member.

A coffee press may include a lid member, where the lid member is microwaveable, a liquid containing member selectively engaged with lid member, where the liquid containing member is microwaveable. The coffee press may include a solid retaining member selectively engaged with the liquid containing member, and a press configured to extend through the liquid containing member and into the solid retaining member.

BRIEF DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Depicted in FIGS. 1-9 is a beverage press 10 of an exemplary configuration. By way of a non-limiting example, the beverage press 10 may be an American coffee press 10. However, the present teachings are not limited to this configuration. Any appropriate configuration or type of beverage press may utilize the present teachings. The present coffee/beverage press may include a three-piece unit having an upper member 20, a middle member 30, and a lower member 40—all of which may be selectively engaged with one another.

Figure 1:
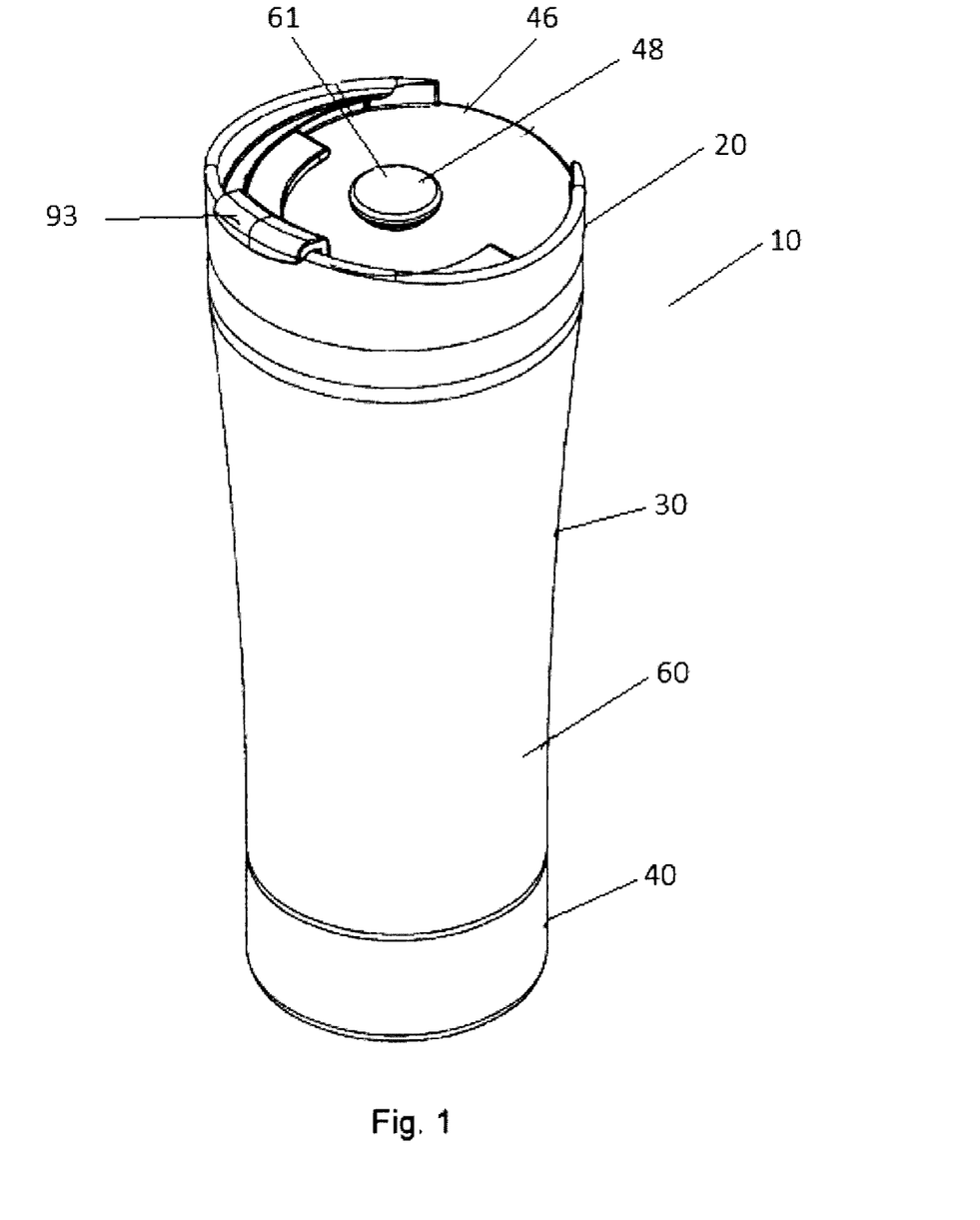
FIG. 1 is a perspective view of a beverage press.
Figure 2:
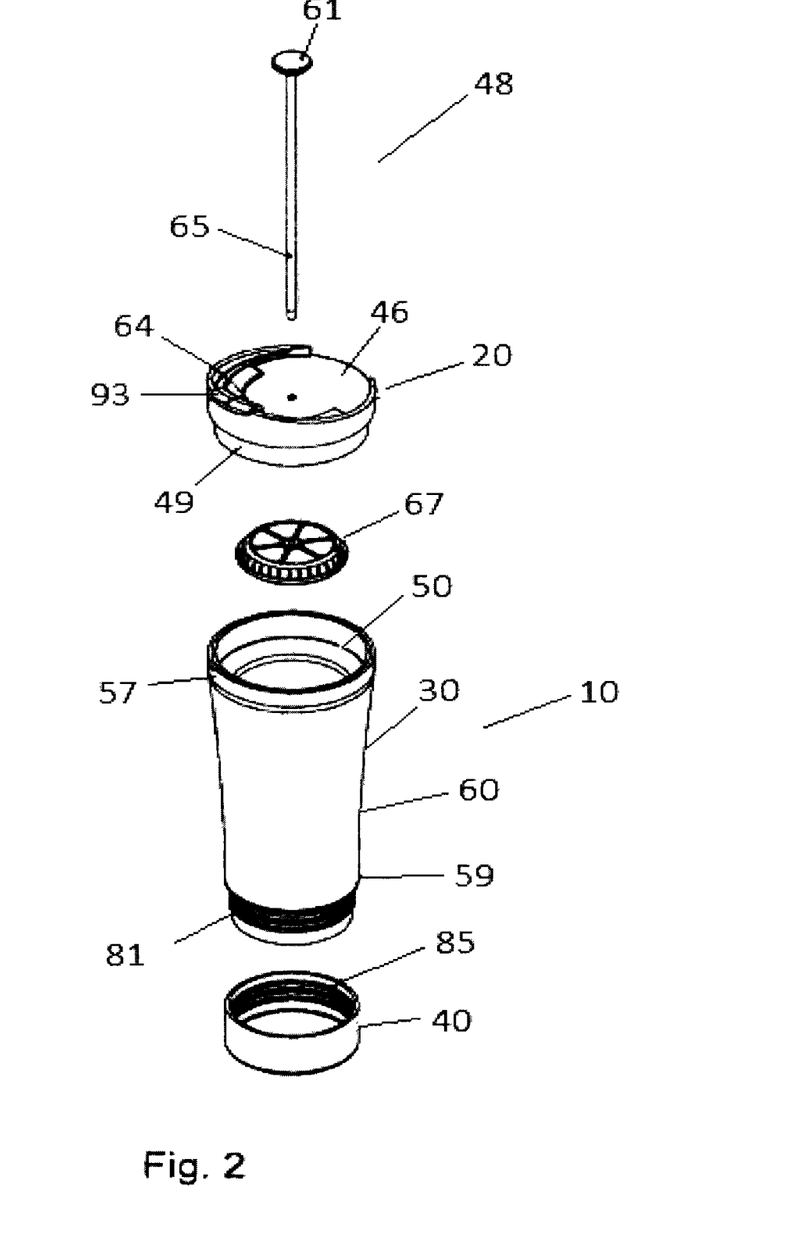
FIG. 2 is an exploded view of a beverage press.

The upper member 20 may be of any appropriate configuration. By way of a non-limiting example, the upper member 20 may form a lid 46 and include a plunger apparatus 48 operatively secured with the lid 46. Further, the upper member 20 may be generally sealable with the middle member 30, such as through friction fit, threaded engagement, snap fitting, fastening, or any other appropriate manner of operatively coupling the upper member 20 with the middle member 30. As shown in FIG. 2, the upper member 20 may include a generally annular sealing member 49 and the middle member 30 may include a correspondingly shaped annular sealing member 50. In such embodiments, the upper member 20 may be friction fit or snap fit with the middle member such that the annular sealing members 49, 50, may operatively and sealingly engage such that liquid is generally prevented from escaping. The annular sealing members 49, 50 may be of a configuration such that the upper member 20 may be selectively attached and detached from the middle member 30.

Figure 6:
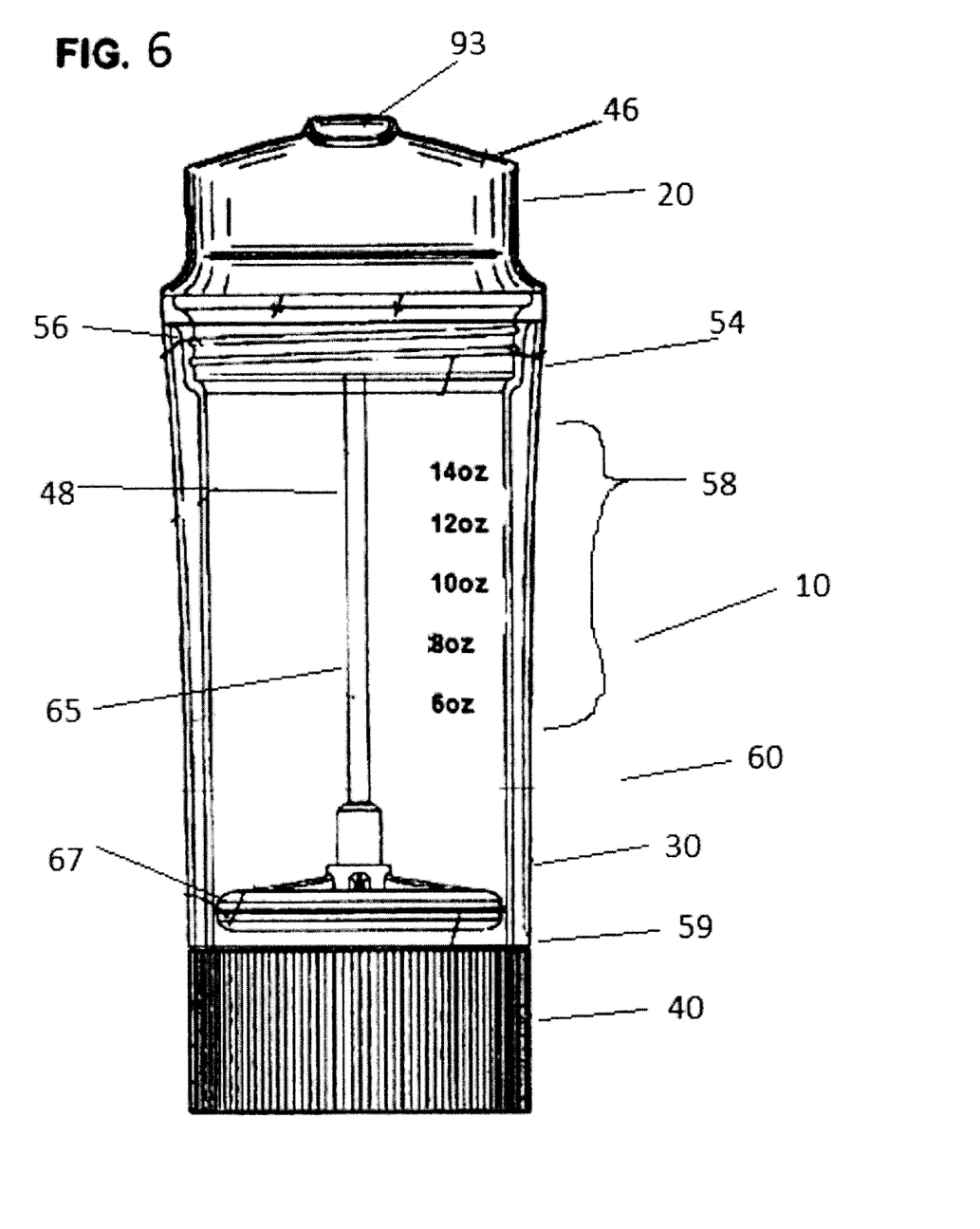
FIG. 6 is a partially exploded view of a beverage press.

In some embodiments such as shown in FIG. 6, the upper member 20 may include male threads 54 and the middle member 30 may include female threads 56. The male threads 54 may be threadingly engageable with the female threads 56 as applicable. In some embodiments, the upper member 20 may include female threads and the middle member 30 may include male threads. Further still, the upper member 20 may include either of a male or female member that is matingly shaped and sized with a corresponding female or male member of the middle member 30 such that the upper member 20 may be selectively and sealably engaged with the middle member 30. This may result in the upper member 20 being configured to be disengaged or engaged, as applicable, with the middle member 30 as desired.

Figure 4:
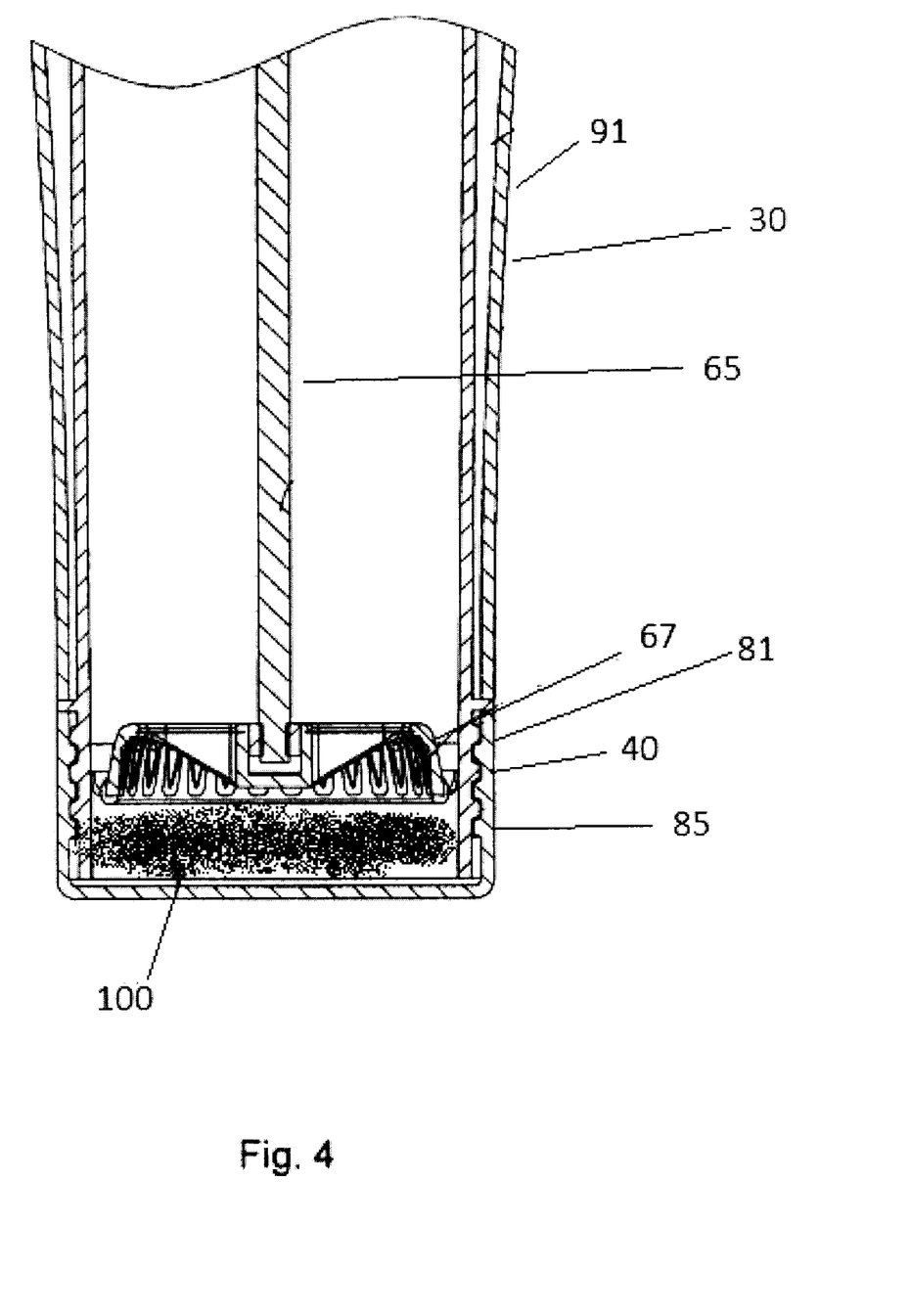
FIG. 4 is a partial cross-sectional view of a beverage press with a plunger in a second position.
Figure 5:
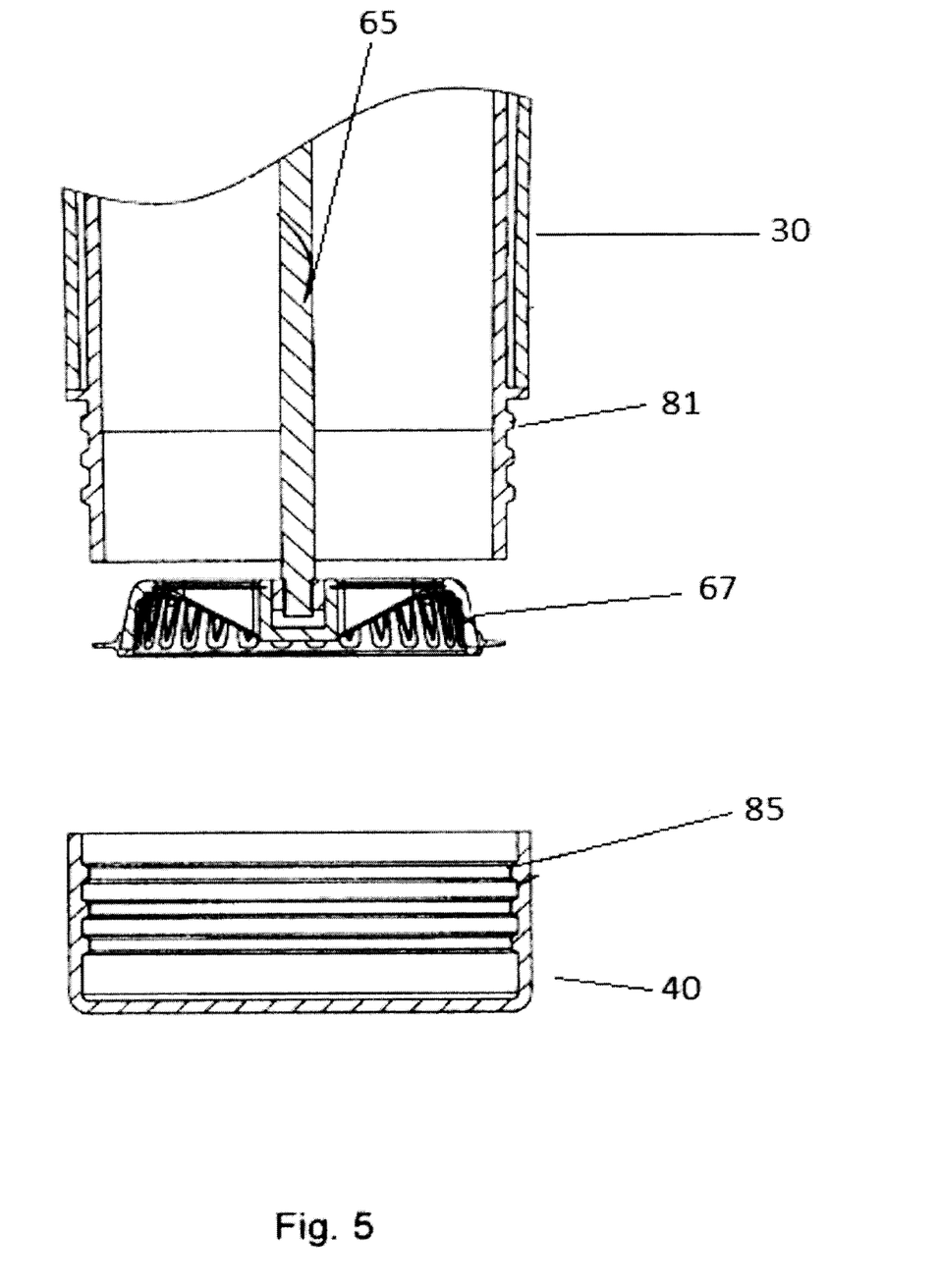
FIG. 5 is an exploded and partial cross-sectional view of a beverage press with a plunger in a second position.

The plunger apparatus 48 may be able to generally be positioned from a top portion 57 of the middle member 30 down to a bottom portion 59 of the middle member 30. This may allow pushing and/or filtering of solids (such as shown in FIG. 4 as 100)—such as coffee grounds, tea leaves, or the like—through an applicable liquid. The plunger apparatus 48 may separate the solid from the liquid. The plunger apparatus 48 may be engaged with the lid 46 in any appropriate manner. The plunger may include a grasping member 61, a shaft 65 and a plunger member 67, which may all be attached together in any appropriate manner. The grasping member 61 may be of any appropriate configuration and is not limited to that shown. The grasping member 61 may be configured to assist a user in grasping and operating the plunger apparatus 48. The grasping member 61 may be formed from a material that is microwaveable.

The shaft 65 may be operatively engaged between the grasping member 61 and the plunger member 67, i.e., the shaft 67 may be operatively attached with the grasping member 61 and the plunger member 67 in any appropriate manner. The user may grasp and operative the grasping member 61 to operatively move the shaft 65, which may operatively position the plunger member 67. The shaft 65 may be formed from any suitable material, including, without limitation being formed from a microwaveable material. The plunger member 67 may be configured to operatively engage the middle member 30 and into the lower member 40. The plunger member 67 may be of a configuration such that it engages with the middle member 30 and lower member 40 such that operation of the plunger apparatus 48 may push solid materials from the middle member 30 and into the lower member 40 while allowing liquid to generally remain in the middle member 30. The plunger member 67 may be formed from any suitable material, including, without limitation being formed from a microwaveable material.

The middle member 30 may be formed from an appropriate material, such as from a generally clear plastic, or any otherwise microwavable material. In the alternative, the middle member 30 may be of a non-microwavable material. By way of a non-limiting example, the middle member 30 may be made of a metal material, e.g., aluminum, stainless steel or any combination of such. Still further, the middle member 30 may be made of a combination of such materials. The middle member 30 may include units 58 with applicable measurements added for the user's convenience such that the user may be able to generally accurately determine the amount of liquid being added to the beverage press 10. Any appropriate measurement unit may be used and any number of such may be used without departing from the present teachings. Still further, the units 58 may not be included, may be included in any appropriate location or may be added to the middle member 30 using a sticker, etching or the like. The middle member 30 may also be generally insulated to maintain beverage temperature for as long as possible. Further, the middle member 30 may be of a generally cylindrical shape. However, the present teachings are not limited to such configuration. The middle member 30 may be of a generally square, rectangular, circular, oval or any other suitable shape.

The lower member 40 may be formed from an appropriate material, such as from a generally clear plastic, dark colored plastic, or any otherwise microwavable material. The lower member 40 may be capable of selectively attaching to and selectively removed from the middle member 30 in any appropriate manner. Selectively removing the lower portion may facilitate cleaning of the beverage press 10. The lower member 40 being selectively removable may facilitate the removal of any solids present from the operation of the beverage press 10, such as coffee grounds or any other applicable solids. The lower member 40 may maintain and hold the solids from the use of the beverage press 10 such that the lower member 40—the solid maintaining member—may be selectively removed from the middle member 30 and the solids contained therein may be easily discarded and the lower member 40 may be easily cleaned for future use.

Figure 7:
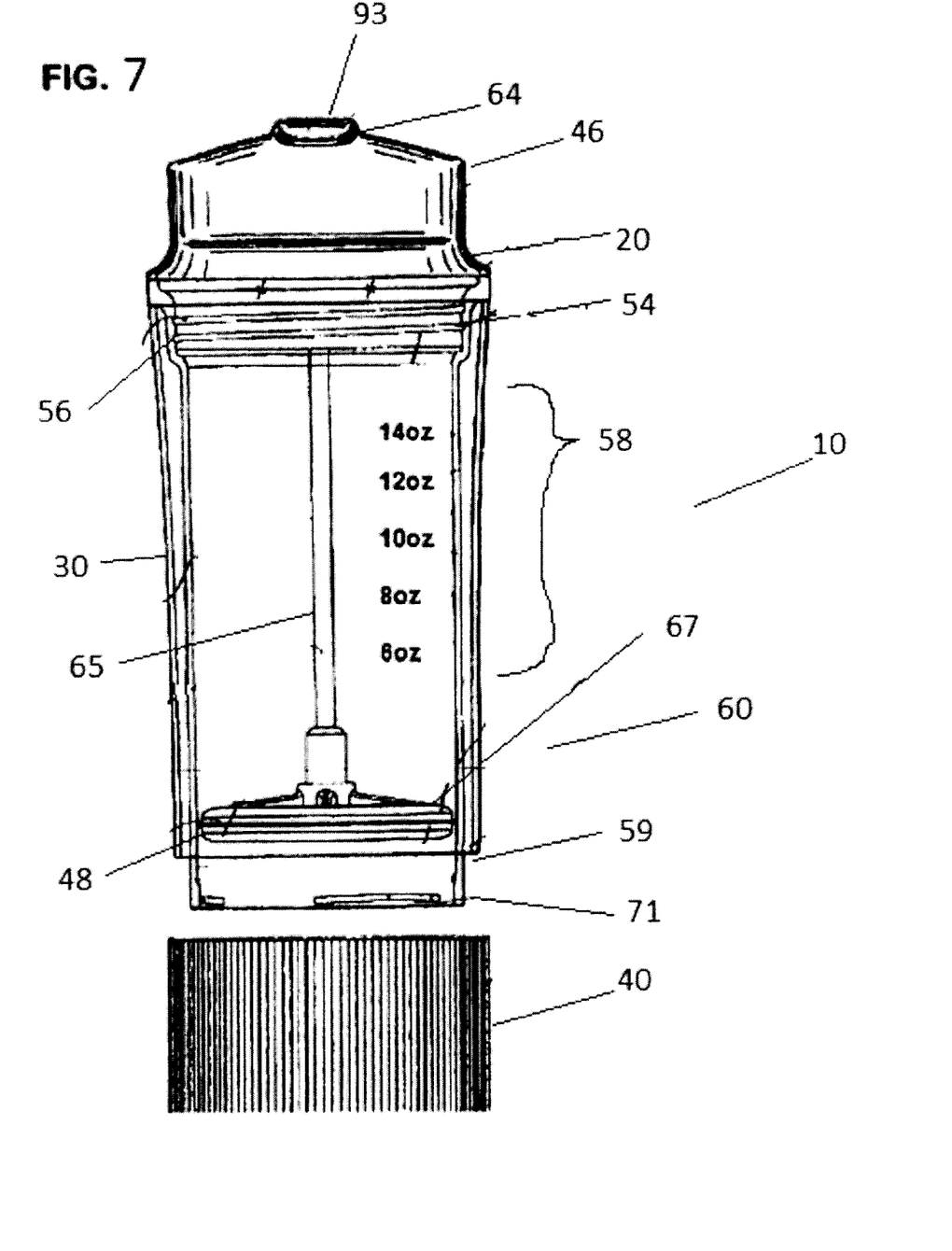
FIG. 7 is a front view of a beverage press.
Figure 8:
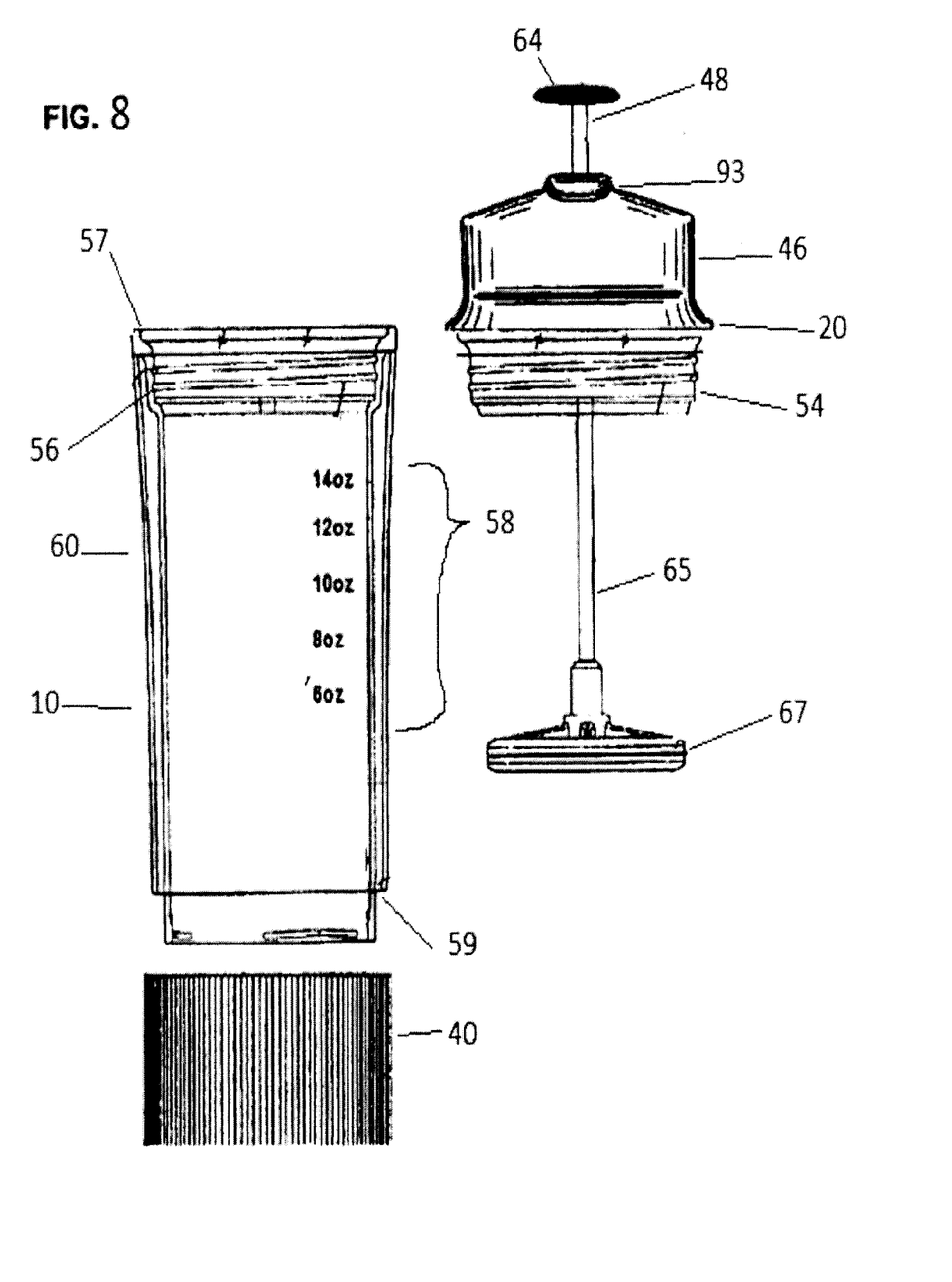
FIG. 8 is an exploded view of a beverage press.
Figure 9:
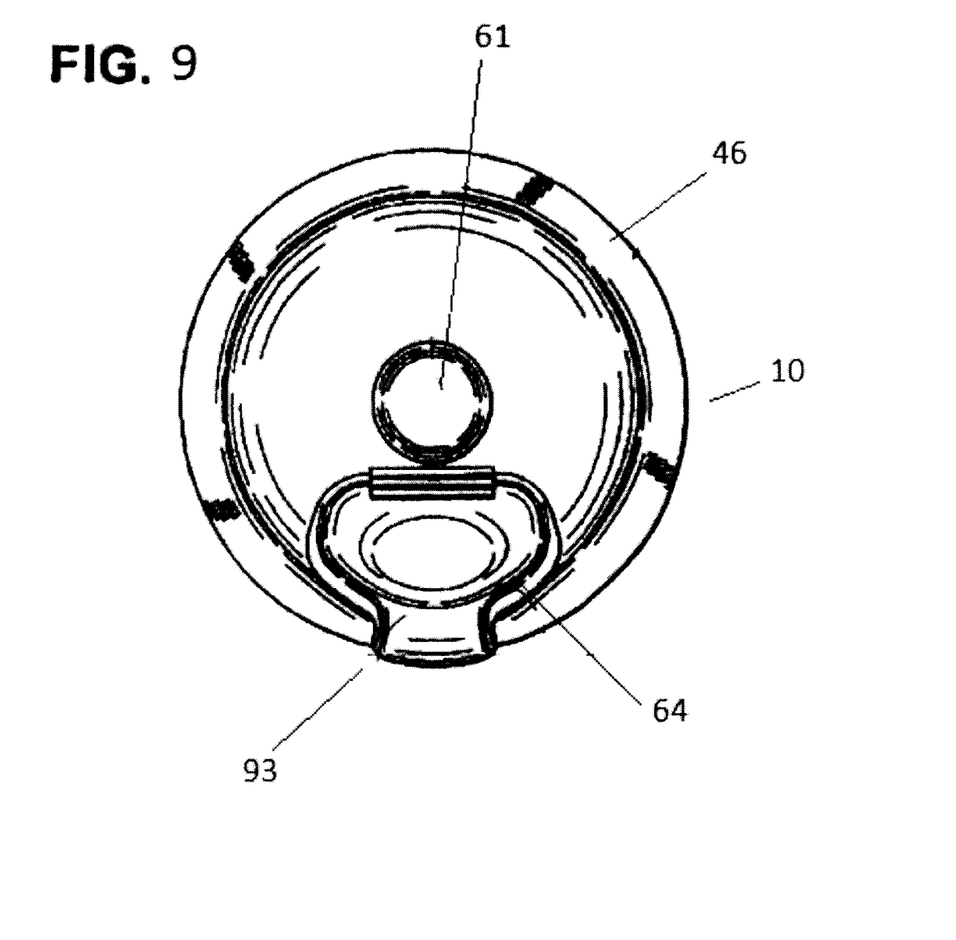
FIG. 9 is a top view of a beverage press.

In some embodiments, the lower member 40 of the beverage press 10 may be capable of selectively disengaging from the middle member 30, including, without limitation by unscrewing, unsnapping, unhinging, friction fit (with or without a sealing member, such as by way of a non-limiting example, an O-ring) or otherwise disengaging from the middle member 30. However, the present teachings are not limited to such configurations; the lower member 40 may be selectively disengageable such as through a bayonet, a keyhole, or any appropriate mechanism. By way of a non-limiting example, and as shown in FIG. 7, the middle portion 30 may include a male bayonet member 71 that may operatively engage with a corresponding female member (not shown) on the lower member 40. In the alternative or in addition, as shown in FIGS. 2-5, the middle portion 30 may include male threads 81 and the lower member 40 may include corresponding female threads 85. Once the lower member 40 is so disengaged, the coffee grounds or other solids may be discarded into the garbage/garden/compost area and the middle member 30, upper member 20 and plunger apparatus 48 may then be rinsed and reassembled for future use.

The three-piece beverage press 10 may attach at a point where rubberized or otherwise reinforced sections may meet so as to generally prevent leakage. These joints may include seals that may be formed from material such as silicone or other elastomeric sealing material. The attachment points may provide a generally seamless point within the beverage press 10 for the plunger apparatus 48 to pass. There may be points within the beverage press 10 that may allow measurement of liquid being inserted, such as water amounts (6 oz, 8 oz, 10 oz, 12 oz, 14 oz portion sizes), potentially with different water-warming instructions for each size (microwave times all to fall within a 2½ minute max).

Figure 3:
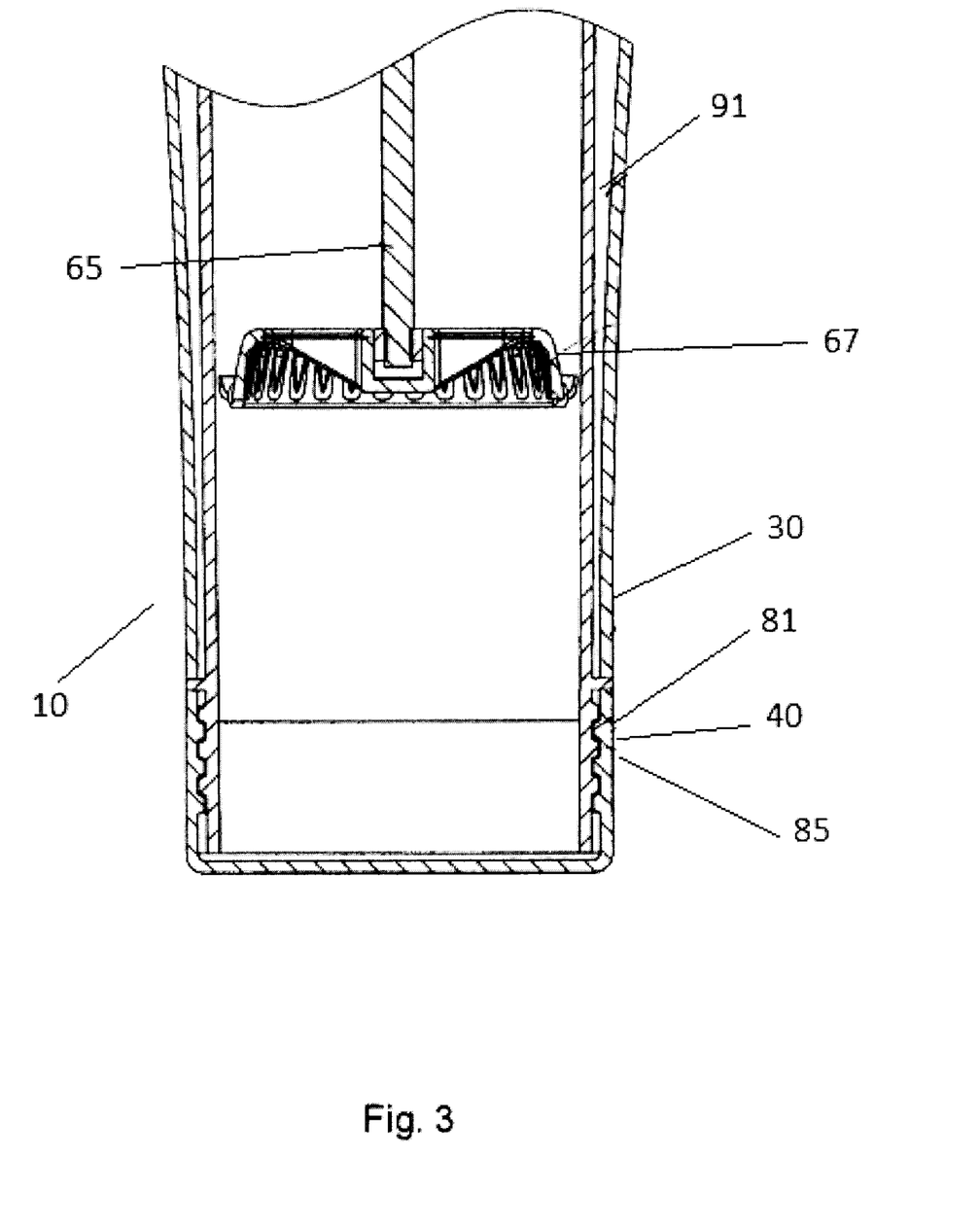
FIG. 3 is a partial cross-sectional view of a beverage press with a plunger in a first position.

In some embodiments, the middle member 30 may of a construction similar in nature to insulated tumblers, i.e., the middle member 30 may include an air gap 91 as shown in FIG. 3. This may help maintain the temperature of the hot liquid for as long as possible. The lower member 40 and middle member 30 may also be manufactured of microwavable-safe plastic (BPA free, etc.) or some otherwise microwavable material. The lid 46 and/or plunger apparatus 48 of the beverage press 10 may potentially include some metal, and therefore may not be entered into the microwavable portion of the beverage preparation—also due to the fact that the solids would usually be entered into the water after microwaving has been created. In other embodiments, however, the lid 46 and/or plunger apparatus 48 may not include any metal such that they may be microwaveable. It is important to note that if hot water is available by some other means (hot water tap, boiling via stove, etc.), that the step-by-step process listed below would still apply, however would then begin at step #4.

The middle member 30 with the lower member 40 selectively attached thereto may form a cup 60 from which a user may be able to drink—the cup 60 may include an air gap 91 that may provide an insulative effect. The lid 46 may include a drinking spout 64 from which a user may drink or the lid 46 may be removed from the middle member 30 and the user may drink directly therefrom. By way of a non-limiting example, the lid 46 may include a drinking spout 64 from which the user may drink. Further still, a seal 93 may be selectively attached to the drinking spout 64 to seal the drinking spout 64 such that the beverage press 10 may be completely sealed so that liquid does not generally escape therefrom.

The steps to use the beverage press 10 may be as follows. It should be understood, however, that the steps may be done in any appropriate order and are not limited to that described. Still further, steps may be added and steps may be skipped without departing from the present teachings.

1. Fill beverage press 10 to desired amount (6 oz, 8 oz, 10 oz, 12 oz intervals, clearly marked in the cup) with plain/filtered water or other liquid.
2. Place beverage press 10 (with or without lid 46 and/or plunger apparatus 48—depending upon whether they are formed from a microwaveable material) into the microwave for approximately 2 minutes to heat water/liquid.
3. Remove beverage press 10 (with or without lid 46, as applicable) from microwave, hot water contained in the beverage press 10.
4. Add desired amount/flavor/brand/etc. of coffee grounds or tea leaves for brewing/steeping.
5. Securely fasten the lid 46 (with plunger apparatus 48) to the beverage press 10, and gently swirl to fully start brewing/steeping.
6. After desired brewing/steeping time, gently press plunger apparatus 48 down to its locking position, and enjoy desired beverage.
7. Upon completion of desired beverage, discard any leftover liquid.
8. Gently unscrew the lower member 40 of the beverage press 10 to reveal spent coffee grounds or tea leaves.
9. Discard majority of grounds/leaves, and simply rinse remaining grounds/leaves from the beverage press 10 and plunger apparatus 48.
10. Rinse the lower member 40 and the plunger apparatus 48 to remove minor leftover grounds/leaves.
11. Reattach the lower member 40, and repeat.

Additional embodiments of a beverage press according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired beverage press without departing from the spirit and scope of the present invention.

The beverage press may further include a multi-server embodiment without departing from the present teachings. The multi-serve beverage press may include may include a three-piece unit having an upper member, a middle member, and a lower member—all of which may be selectively engaged with one another. The lower member may be selectively removable from the middle member similar to as described above. The lower member of these embodiments may be of a size such that it may contain and maintain an amount of solids, such as coffee grounds, to prepare a beverage for multiple users. Removing the lower member of the multi-serve embodiment would be of substantially similar approach as described above, i.e., sealable connections (via snapping, bayonet fastener, friction fit, threaded joining, or otherwise engaging), and a large enough lower member to retain the amount of solids applicable for the size of the beverage press.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A coffee press comprising:
   a lid member, wherein the lid member is microwaveable;
   a liquid containing member selectively engaged with lid member, wherein the liquid containing member is microwaveable, the liquid containing member including an open lower end;
   a solid retaining member selectively engaged with the liquid containing member forming a closure for the open lower end of the liquid containing member; and
   a press configured to extend through the liquid containing member and into the solid retaining member.

2. The coffee press of claim 1, wherein the lid member includes a drinking spout.

3. The coffee press of claim 2 further comprising a seal selectively and sealingly engaging the drinking spout.

4. The coffee press of claim 1, wherein the press is selectively removable from the liquid containing member and solid retaining member.

5. The coffee press of claim 1, wherein the solid retaining member is threadably engaged with the liquid containing member.

6. The coffee press of claim 5, wherein the threaded engagement between the solid retaining member and liquid containing member forms a liquid tight seal generally preventing liquid from escaping therefrom.

7. The coffee press of claim 1, wherein the liquid containing member includes a plurality of markings identifying a plurality of liquid volumes of the liquid containing member.

8. A beverage press comprising:
a lid;
a liquid containing member selectively engaged with the lid, the liquid containing member including an open lower end;
a press extending within the liquid containing portion; and
a solid retaining member selectively attached to and removable from the liquid containing member forming a closure for the lower open end of the liquid containing member, wherein the press extends into the solid retaining member to press solid contents into the solid retaining member.

9. The beverage press of claim 8, wherein the solid retaining member is threadably engaged with said liquid containing member.

10. The beverage press of claim 8, wherein the solid retaining member includes a male fastening member and said liquid containing member includes a female fastening member, whereby the male member is selectively and sealingly engaged with the female member.

11. The beverage press of claim 8, wherein the solid retaining member includes a female fastening member and said liquid containing member includes a female fastening member, whereby the male member is selectively and sealingly engaged with the female member.

12. The beverage press of claim 8, wherein the solid retaining member and the liquid retaining member are selectively and sealingly engaged through a bayonet mount.

13. The beverage press of claim 8 further comprising a seal operatively engaged between the solid retaining member and liquid retaining member providing a liquid tight seal.

14. The beverage press of claim 13, wherein the seal includes an O-ring operatively engaged with at least one of the solid retaining member and liquid retaining member.

15. A beverage press comprising:
a lid;
a liquid containing member having upper and lower portions, wherein the upper portion of the liquid containing member is selectively engaged with the lid and the lower portion has an open end;
a press operatively secured with the lid and extending within the liquid containing portion, wherein the press is microwaveable; and
a solid retaining member selectively engaged with the lower portion of the liquid containing member forming a closure for the open end of the lower portion, wherein the solid retaining member selectively engaged with the liquid containing member creates a liquid tight seal generally preventing liquid from escaping therefrom and wherein the press operatively extends into the solid retaining member forcing solids within the liquid containing member into the solid retaining member.

16. The beverage press of claim 15, wherein the liquid containing member includes markings identifying volumes of portions of the liquid containing member.

17. The beverage press of claim 15, wherein the lid, liquid containing member, solid containing member and press are microwaveable when selectively engaged with one another.

18. The beverage press of claim 15, wherein the solid containing member is selectively disengageable with the liquid containing member and configured to dispose of solids therein.

* * * * *